Patented June 1, 1937

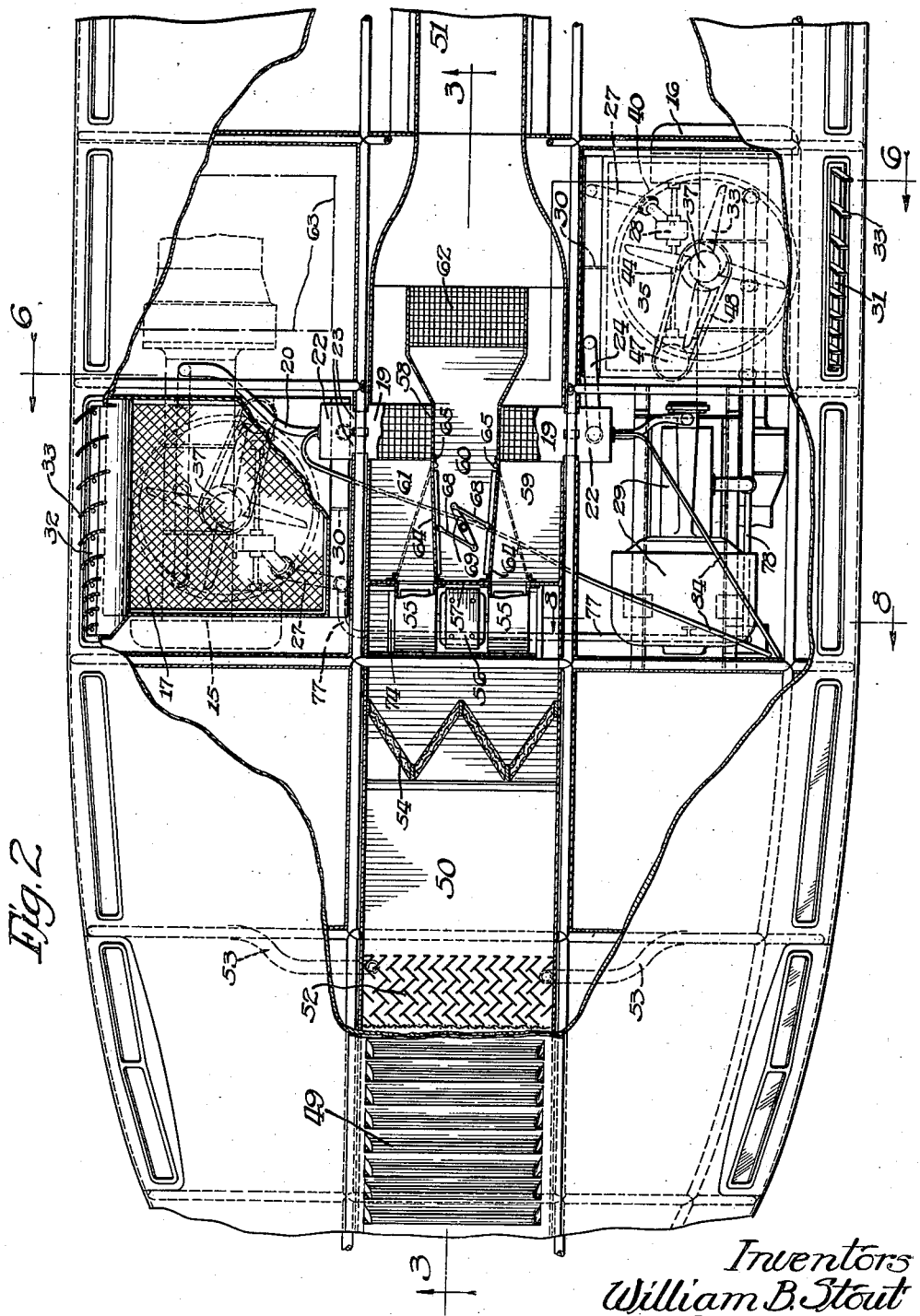

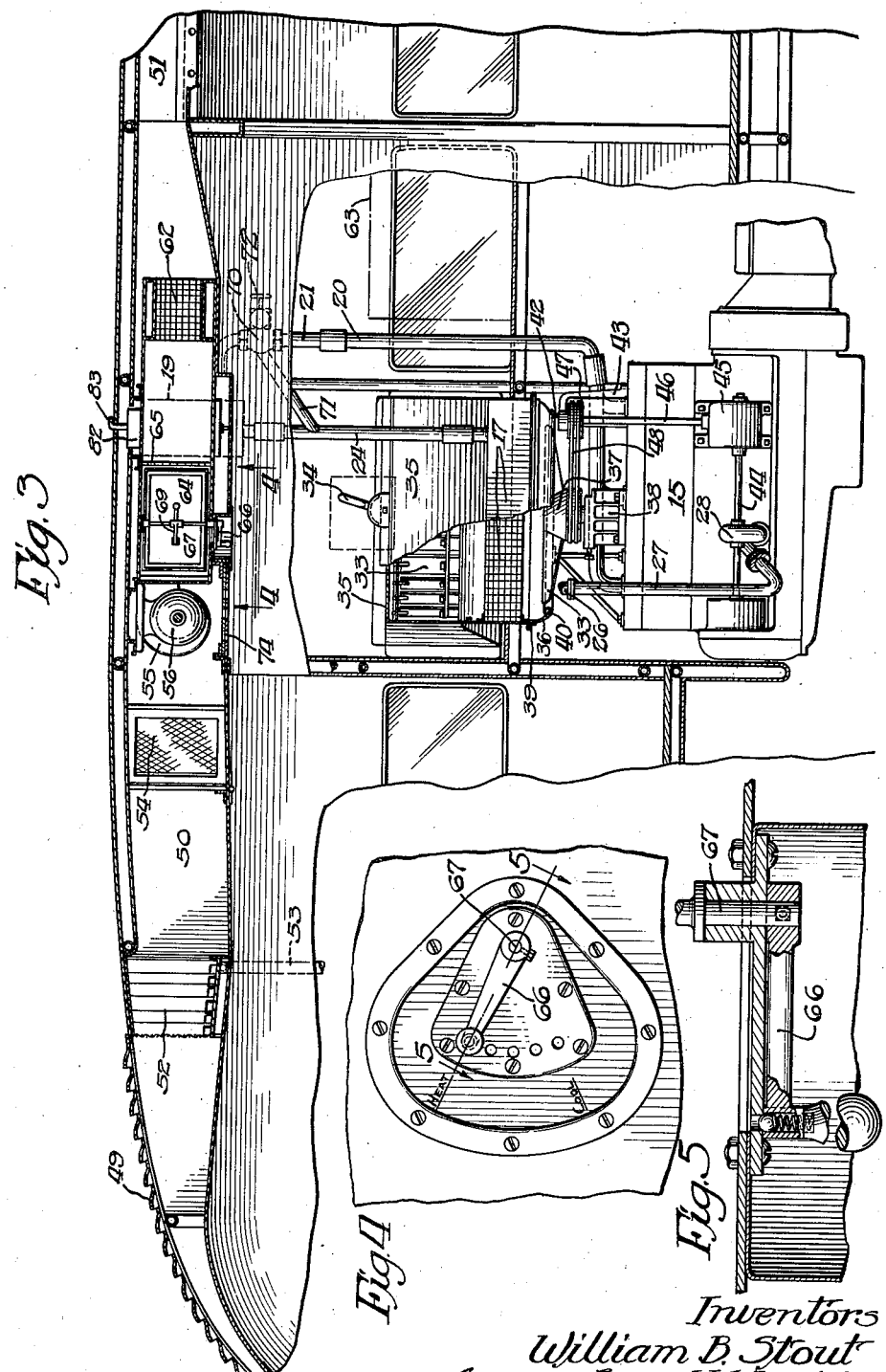

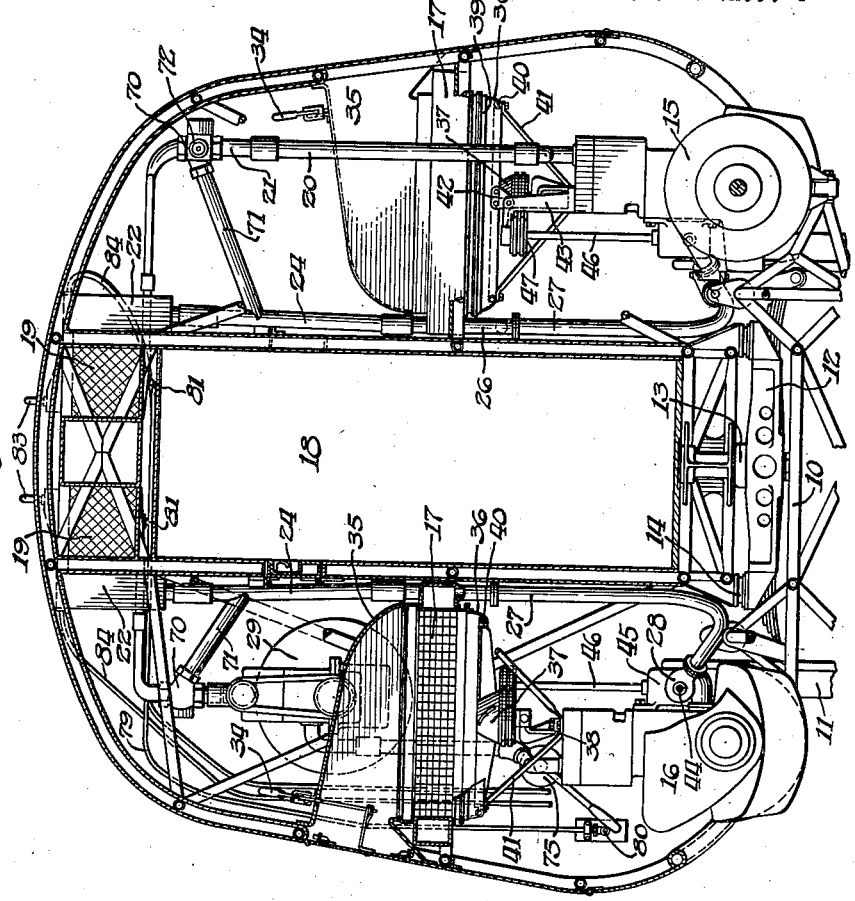

2,082,230

UNITED STATES PATENT OFFICE 2,082,230

ENGINE COOLING AND AIR CONDITIONING SYSTEM FOR SELF-PROPELLED VEHICLES

William B. Stout and Evan H. Wright, Detroit, Mich., assignors to Pullman-Standard Car Manufacturing Company, a corporation of Delaware Application August 28, 1934, Serial No. 741,792

17 Claims. (Cl. 257—7)

This invention relates to self propelled vehicles and has for its principal objects to provide an engine cooling system especially adapted for stream-lined rail cars, and to combine the cooling system for the engines with the ventilating system for the car.

The specific embodiment here shown is made on the railway car forming the subject matter of the copending application of William B. Stout, Serial No. 687,999, filed September 2, 1933, and an article by that applicant in Popular Mechanics, February, 1934, page 170.

Fig. 2 is a plan view with the roof portion of the car broken away;

Fig. 3 is a vertical section taken on the line 3—3 of Fig. 2;

Fig. 4 is an inverted plan view of control mechanism for fans or dampers used in deflecting the ventilating current of air with respect to heating radiators and a surface cooler;

Fig. 5 is a sectional view taken on the line 5—5 of Fig. 4;

Fig. 6 is a transverse sectional view through the car, taken on the line 6—6 of Fig. 2;

Fig. 7 is a fragmentary perspective view showing the fans or louvres by which the draft through the cooling radiators is controlled;

Fig. 8 is a fragment of a transverse section taken on the line 8—8 of Fig. 2.

Figure 1:
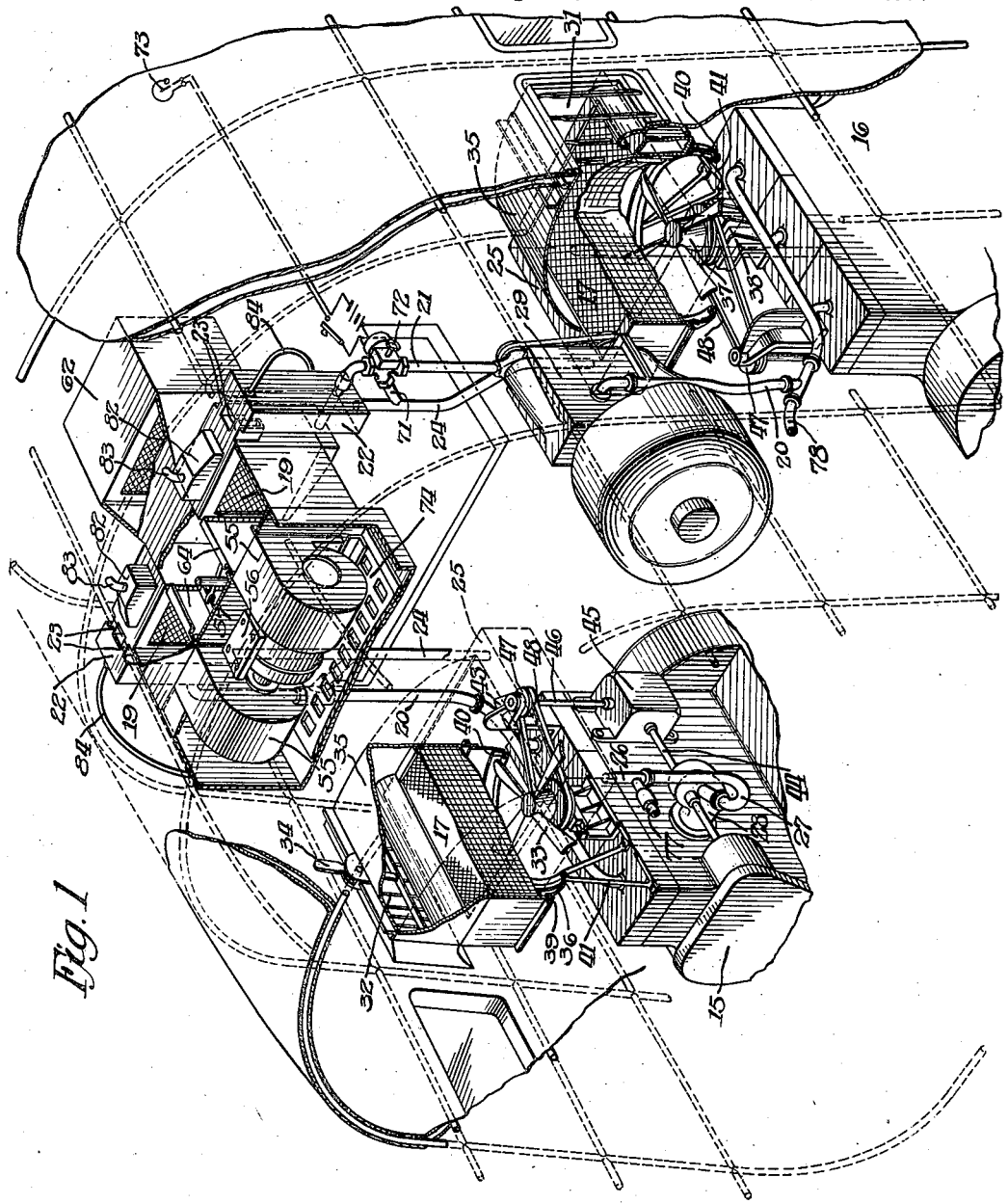
Fig. 1 is a perspective view of a portion of the railway car showing the two engines and their relation to the radiators and other parts of the cooling system.

But this embodiment is here used for the purpose of disclosure only, realizing that the invention is susceptible of many other embodiments and features of it will lend themselves readily to other uses, all of which are intended to be covered.

A swing-motion truck (Fig. 6) comprising a frame 10, wheels 11 and bolster 12, bears the front end of the body on a center bearing 13 and side bearings 14.

Two engines 15 and 16, mounted at the sides of the truck, drive the axles through worm gearing, the right engine driving the rear axle at the right end and the left engine driving the front axle at the left end.

The cooling system for the engines includes radiators 17 mounted in corresponding horizontal positions in the body at each side of a passageway 18. These are called cooling radiators to distinguish them from others shown at 19, and called heating radiators, because they are used to heat air for the car.

Water from the right engine 15 (Fig. 6) rises through the flexible metallic hose 20 and piping 21, which passes through an expansion tank 22 and enters the bottom of the heating radiator 19. After rising through this radiator, the water flows through two passages 23 into the top of the expansion tank 22, thence out at the bottom through pipe 24 to the rear side of a tank or header 25, forming parts of the radiator 17. From this header the water flows through half the radiator 17 to a header at the opposite side, then inwardly through the other half and out through piping 26 to another flexible hose 27 leading to the water pump 28 at the inner side of the engine 15.

The system at the left side comprises similar parts indicated by the same numerals except that the piping 21 is connected through the jacket of a gas electric unit 29, to the end that the engine of that unit shall also be cooled.

In the plan view of Fig. 2, a partition 30 is shown across the middle of the tank 25 for the purpose of directing the water through the rear half of the radiator, as described.

Air for the radiators 17 is taken through inlets 31 and 32 (Fig. 2) at each side of the body, controlled by a series of graded louvres 33, adjusted by levers 34, best shown in Figs. 6 and 7.

On each side of the car the inlet air is directed to the radiator 17 by the sheet metal top 35 of the pocket which accommodates the engine and its radiator.

Flexible conduits 36 conduct the air from the radiators 17 to fans 37, mounted on brackets 38, bolted to the top of the engines 15 and 16. These conduits are made of waterproof canvas, having their upper ends fixed to the lower sides of the radiators by angle pieces 39 and their lower ends fixed to tubular rings 40. V-shaped braces 41 (Fig. 6) connect two points on the rings 40 with the corresponding engine and plate brackets 42 connect another point on each ring to brackets 43, also bolted to the top of the corresponding engine.

The fans are driven from the pump shafts 44 through gearing 45, upright shafts 46, pulleys 47 and belts 48, the upper ends of the shafts 46 being journaled in the brackets 43.

Ventilation

The ventilating system of the car includes an inlet overhead at the front (Figs. 2 and 3) guarded by louvres 49, a relatively wide chamber 50 and a delivery duct 51. Just to the rear of the louvres 49 the chamber is provided with water eliminators 52 and drain pipes 53 leading through the body along the wall to the ground. To the rear of the eliminators are filters 54, and to the rear of those, twin blowers 55, driven by a single motor 56.

To the rear of the blowers a transverse partition 57 and lengthwise partitions 58, provide the chamber into three passages 59, 60 and 61. The heating radiators 19, heretofore mentioned in connection with the cooling system for the engines, are located in the passages 59 and 61 on opposite sides of the passage 60. To the rear of the radiators 19 the passage 60 is enlarged and receives a surface cooler 62 supplied with a circulating refrigerant from refrigerating apparatus 63, mounted in the car over the right engine 15.

Vanes or gates 64 (Fig. 2) hinged at 65, and controlled by lever 66 (Fig. 5) through a shaft 67, links 68 and lever 69, may be thrown from the solid line position in Fig. 2 towards or to the dotted line position in that figure, thereby deflecting a part or all of the air delivered by the blowers 55 from the passages 59 and 61 to the passage 60.

When it is desired to have all the air pass through the passage 60 and the surface cooler 62, it will be well to remove the heat from the heating radiators 19. For this purpose two-way valves 70 are interposed in the piping 21 (Figs. 1 and 6) and shunt pipes 71 are inserted between these valves and the piping 24. The dual valves are operated manually by handles 72, or automatically by thermostats 73.

The character of the refrigeration apparatus 63 is a matter of selection. In some instances a refrigeration machine will be the choice, and in others ice bunkers and a pump will be preferred.

Air from the interior of the car can be returned to the chamber 50 for recirculation by adjusting a door or hatch 74, located in advance of the transverse partition 57.

The adjustment of the vanes or gates 64 will depend upon the conditions. When partially turned from the solid line position in Fig. 2, some of the air will go through the surface cooler 62 and be cooled and dried, the remainder will go through the heating radiators 19 and, mixing with the cooled, dried air, will cause the whole to be brought to the desired temperature and humidity.

This may also call for some adjustment of the flow through the heating radiators, which can be made by the handles 72. Skilled operators will vary the adjustment and operation of the apparatus to provide conditioning of the air under the varying conditions of travel and the weather.

For charging the cooling system with water a hand pump 75 (Fig. 8) is mounted at the left side above the engine 16 and provided with a nipple to receive water hose 76 and valve controlled piping 77 and 78, leading to the respective engines, as best shown in Figs. 1 and 8.

For heating the car when standing in stations or yards, a pipe 79 (Fig. 8) having a nipple 80 to connect with a station steam line is led upwardly and connected with the heating radiators 19 at their bottoms, as best shown at 81, Fig. 6.

Ordinarily when the system is cool the water will not stand as high as the radiators 19, or much above their lower surfaces. Steam used for heat will cause condensation, but the excess water thus obtained can easily be drawn off through the pipe 79 after the steam hose is disconnected. If this is done before starting the engine, antifreeze solutions will not be diluted.

Steam supplied to the radiators 19 and not condensed will rise to the chamber 82 (Fig. 1) and escape through the nipples 83.

The expansion tanks 22 will usually be sufficient to take care of the expansion of the cooling water but, if not, the excess can escape through the overflow pipes 84 (Figs. 2, 6, and 8).

Two engines mounted on the truck and rotating with it with respect to the body in turning curves and radiators carried on the body, present a new problem admirably solved by this invention.

Introducing heating radiators at the top of the cooling system for the engines, and associating them with the ventilating system of the car, assist in dissipating the excess heat and puts a portion of that heat to a useful purpose in conditioning the air.

We claim as our invention:—

1. In a self-propelled car, a body, a supporting truck adapted to swing with respect to the body, an engine mounted on the truck, a cooling system for the engine including a radiator on the body, flexible water connections between the radiator and the engine, a fan mounted to swing with the engine, and a flexible conduit leading from the radiator to the fan.

2. In a self-propelled car, a body, a supporting truck adapted to swing with respect to the body, an engine mounted on the truck, a cooling system for the engine including a radiator enclosed by the body above the engine, an air duct leading from the outside to the radiator, a fan driven by and swinging with the engine, and a flexible conduit having one end fast to the body and the other end surrounding and swinging with the fan.

3. In a self-propelled car, a body, a supporting truck adapted to swing with respect to the body, an engine mounted on the truck, a cooling system for the engine including a radiator on the body, flexible water connections between the radiator and the engine, a fan mounted on the engine and a flexible conduit having one end surrounding the fan and fixed to the engine and the other end connected with the radiator.

4. In a self-propelled vehicle, a body having an inlet opening for air, a supporting truck adapted to swing relative to the body, an engine on the truck, a radiator for the engine on the body, a duct leading from the inlet to the radiator, a fan on the engine, and a flexible conduit leading from the radiator to the fan.

5. In a self-propelled vehicle, a body, an engine, a cooling radiator above the engine, a heating radiator above the cooling radiator and connections leading water from the engine to the heating radiator, thence to the cooling radiator, thence to the engine, a surface cooler associated with the heating radiator and means for passing air over the heating radiator and the surface cooler, and delivering it into the car.

6. In a self-propelled vehicle, a body, two engines, a cooling system for each engine including a radiator carried by the body, a surface cooler, also carried by the body, means for passing air over the radiators and the cooler into the body, and means for deflecting air from either the radiator or the cooler.

7. In a self-propelled vehicle, a body, two engines, a cooling system for each engine including a radiator overhead in the body, a surface cooler also overhead in the body, a ventilating system for the body including means to pass air over the radiators and cooler, and means for deflecting air from either the radiators or the cooler.

8. In a self-propelled vehicle, a body, two engines, a cooling system for each engine including a radiator overhead in the body, the two being spaced apart in separate passages, a surface cooler also overhead in a passage between the first two, and valves to control the flow in the passages.

9. In a self-propelled vehicle, an engine for operating said vehicle, a body having a passenger space, means for introducing air into said space from the exterior of said vehicle, means including a radiator element for said engine for heating said air, a cooling element for cooling said air, means for directing a portion of the air through said element and the remainder through said radiator, whereby said air will be dried and heated, and means for recirculating air within said vehicle through one or the other of said elements.

10. In a self-propelled vehicle, a body, an engine for propelling said vehicle, a horizontal cooling radiator above said engine, a passage for conducting air through a longitudinal side wall of said body to the upper surface of said radiator, and means for causing said air to flow downwardly through said radiator and thence down onto the head of the engine.

11. In a self-propelled vehicle, a body having a vertical pocket, a water-cooled internal combustion engine for propelling the vehicle positioned in the lower portion of the pocket, a horizontal cooling radiator for the engine mounted in the pocket above the engine, a heating radiator in the vehicle body above the level of the cooling radiator, and connections leading water from the engine to the heating radiator, thence to the cooling radiator, and thence to the engine.

12. In a self-propelled vehicle, a body having a vertical pocket, a water-cooled internal combustion engine for propelling the vehicle positioned in the lower portion of the pocket, a horizontal cooling radiator for the engine mounted in the pocket above the engine, a heating radiator in the vehicle body above the level of the cooling radiator, and connections leading water from the engine to the heating radiator, thence to the cooling radiator, and thence to the engine, the body wall at a side of the pocket having an opening above the cooling radiator for admitting air from the exterior of the body, and means for delivering said air down through the cooling radiator.

13. In a self-propelled vehicle, a body having a vertical pocket, a water-cooled internal combustion engine for propelling the vehicle positioned in the lower portion of the pocket, a horizontal cooling radiator for the engine mounted in the pocket above the engine, a heating radiator in the vehicle body above the level of the cooling radiator, and connections leading water from the engine to the heating radiator, thence to the cooling radiator, and thence to the engine, and a valved pipe between the heating radiator delivery and discharge connections for shunting out the heating radiator.

14. In a self-propelled vehicle, a body having a vertical pocket, a water-cooled internal combustion engine for propelling the vehicle positioned in the lower portion of the pocket, a horizontal cooling radiator for the engine mounted in the pocket above the engine, a heating radiator in the vehicle body above the level of the cooling radiator, and connections leading water from the engine to the heating radiator, thence to the cooling radiator, and thence to the engine, the body wall at a side of the pocket having an opening above the cooling radiator for admitting air from the exterior of the body, and means for delivering said air down through the cooling radiator and thence over said engine, the bottom of the pocket being open to exhaust said air.

15. In a self-propelled vehicle, a body having a side pocket, a supporting truck adapted to swing with relation to the body, a water-cooled internal combustion engine for driving the vehicle mounted on the truck and extending up into the body pocket, and a radiator for the engine mounted on the body in the pocket and above the engine, said body having an opening through the pocket wall to the exterior of the vehicle for admitting air to the radiator.

16. In a self-propelled vehicle a body, an engine for propelling said vehicle, a cooling radiator for said engine mounted substantially horizontally in the body above the level of said engine and substantially within the plan projection of said engine, said body having an opening for admitting air from the exterior of the vehicle and an opening for discharging air therefrom, and means for forcing a positive draft of air through the first-named opening and over said engine and radiator and thence through said discharge opening.

17. In a self-propelled vehicle, a body, an engine for propelling said vehicle, a cooling radiator for said engine mounted substantially horizontally in the body above the level of said engine and having a substantial portion within the plan projection of said engine, said body having an opening for admitting air from the exterior of the vehicle and an opening for discharging air therefrom, means for forcing a positive draft of air through said openings, and means for directing said air, intermediate the openings, through the named portion of the radiator and over the engine.

WILLIAM B. STOUT.
EVAN H. WRIGHT.